J. R. SCHOONMAKER.
FISH BAIT OR LURE.
APPLICATION FILED NOV. 15, 1915.
1,193,077.
Patented Aug. 1, 1916.
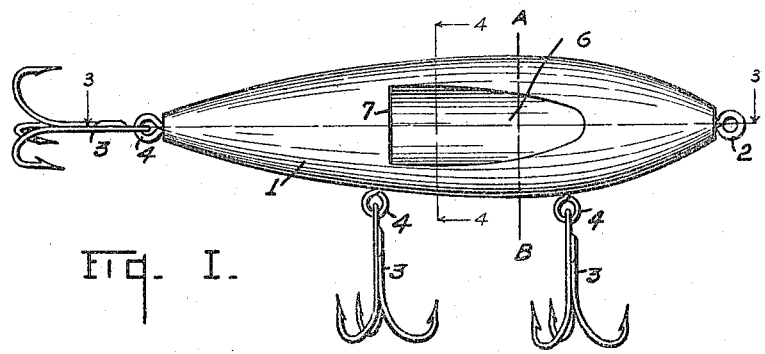
FIG. I.
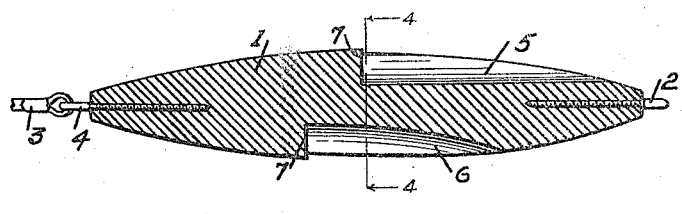
FIG. III.
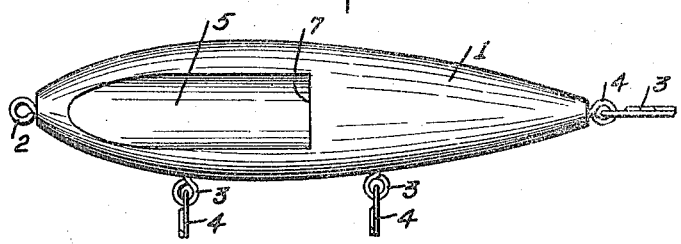
FIG. II.
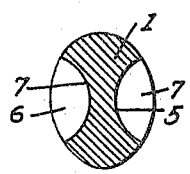
FIG. IV.
WITNESSES:
INVENTOR.
John R. Schoonmaker
BY
ATTORNEYS.

UNITED STATES PATENT OFFICE.

JOHN RAY SCHOONMAKER, OF KALAMAZOO, MICHIGAN.

FISH BAIT OR LURE.

1,193,077.    Specification of Letters Patent.    Patented Aug. 1, 1916.

Application filed November 15, 1915. Serial No. 61,539.

*To all whom it may concern:*

Be it known that I, JOHN RAY SCHOONMAKER, a citizen of the United States, residing at Kalamazoo, county of Kalamazoo, State of Michigan, have invented certain new and useful Improvements in Fish Baits or Lures, of which the following is a specification.

This invention relates to improvements in fish baits or lures.

The main object of my invention is to provide an improved fish bait or lure which takes a swimming or zig zag course when drawn through the water and one which at the same time is simple and economical in structure.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a side view of my improved fish bait or lure. Fig. II is a side view of the other side of my improved bait or lure, the hooks being broken away. Fig. III is a central horizontal longitudinal section on a line corresponding to line 3—3 of Fig. I. Fig. IV is a transverse section on a line corresponding to line 4—4 of Figs. I and III.

In the drawing similar reference characters refer to similar parts throughout the several views, and the sectional views are taken looking in the direction of the little arrows at the ends of the section lines.

Referring to the drawing, the body 1 of my improved fish bait or lure is tapered toward both ends from a point A—B, which is in front of the longitudinal center of the body. The body is preferably oval in cross section, as best shown in Fig. IV, and is provided with a line attaching eye 2 at its front end.

I preferably attach bottom and tail hooks 3 by means of screw eyes 4. These hooks may be arranged as desired but when attached to the bottom and tail as shown the hooks assist in balancing the body.

The body is provided with longitudinal grooves 5 and 6 in its sides, the front and rear ends of the groove 6 being at the rear of the front and rear ends respectively of the groove 5. The front end of the groove 5 is preferably near the front end of the body while the front end of the groove 6 is preferably near the point of greatest diameter of the body. These grooves are of substantial cross section and length and are preferably of increasing depth and terminate in abrupt shoulders 7. The grooves are preferably curved in cross section, as illustrated. The positioning of the grooves on the body may be considerably varied, but should be disposed oppositely and with the rear end of the one nearer the rear end of the body than the rear end of the other. With the body thus formed it takes a pronounced zig zag or swimming course when drawn through the water, effectively simulating the darting or zig zag course ordinarily taken by a fish or minnow in attempting to escape.

My improved bait or lure is very effective in catching fish, is economical to produce and the body can be effectively enameled or otherwise finished.

Having thus described my invention, what I claim as new and desire to secure by Letters Patent, is:

1. A fish bait or lure, comprising a body oval in cross section and tapered toward both ends, the greatest diameter of the body being in front of its longitudinal center, said body having longitudinal side grooves of substantial cross section and length increasing in depth toward the rear and terminating in abrupt shoulders, the front and rear ends of one groove being to the rear of the front and rear ends respectively of the other, the front end of one groove being near the front end of the body and the front end of the other being near the greatest body diameter, a hook and hook attaching means, and a line attaching means at the front end of said body.

2. A fish bait or lure, comprising a body oval in cross section and tapered toward both ends, the greatest diameter of the body being in front of its longitudinal center, said body having longitudinal side grooves of substantial cross section and length, the front and rear ends of one groove being to the rear of the front and rear ends respectively of the other, the front end of one groove being near the front end of the body and the front end of the other being near the greatest body diameter, a hook and hook attaching means, and a line attaching means at the front end of said body.

3. A fish bait or lure comprising a body tapered toward both ends and having oppositely disposed longitudinal grooves of substantial cross section and length increasing in depth toward the rear, the front and rear ends of one groove being at the rear of the front and rear ends respectively of the other, and a line attaching means at the front end of said body.

4. A fish bait or lure, comprising a body tapered toward both ends and having oppositely disposed longitudinal grooves of substantial cross section and length, the front and rear ends of one groove being at the rear of the front and rear ends respectively of the other, and a line attaching means at the front end of said body.

5. A fish bait or lure, comprising a body tapered toward both ends and having oppositely disposed longitudinal grooves of substantial cross section and length, the front end of one groove being near the front end of the body and the front end of the other being near the point of greatest body diameter, a hook and hook attaching means, and a line attaching means at the front end of said body.

6. A fish bait or lure, comprising a body having oppositely disposed longitudinal grooves of substantial cross section and length increasing in depth toward the rear with the rear end of one groove nearer the rear end of the body than the other, a hook and hook attaching means, and a line attaching means at the front end of said body.

7. A fish bait or lure comprising a body having oppositely disposed longitudinal grooves of substantial cross section and length with the rear end of one groove nearer the rear end of the body than the other, a hook and hook attaching means, and a line attaching means at the front end of said body.

8. A fish bait or lure comprising a body, having oppositely disposed longitudinal grooves of substantial cross section and length, the front and rear ends of one groove being located to the rear of the front and rear ends respectively of the other groove, a hook and hook attaching means, and a line attaching means at the front end of said body.

In witness whereof, I have hereunto set my hand and seal in the presence of two witnesses.

JOHN RAY SCHOONMAKER. [L. S.]

Witnesses:
LUELLA G. GREENFIELD,
MARGARET L. GLASGOW.

Copies of this patent may be obtained for five cents each, by addressing the "Commissioner of Patents, Washington, D. C."